(12) United States Patent
Poovarodom et al.

(10) Patent No.: US 7,067,651 B2
(45) Date of Patent: Jun. 27, 2006

(54) NON-SYNTHETIC BIODEGRADABLE STARCH-BASED COMPOSITION FOR PRODUCTION OF SHAPED BODIES

(75) Inventors: Ngamtip Poovarodom, Bangkok (TH); Saisanom Praditdoung, Bangkok (TH)

(73) Assignee: Kasetsart University, Bangkok (TH)

( * ) Notice: Subject to any disclaimer, the term of this patent is extended or adjusted under 35 U.S.C. 154(b) by 114 days.

(21) Appl. No.: 10/282,205

(22) Filed: Oct. 29, 2002

(65) Prior Publication Data
US 2003/0047110 A1 Mar. 13, 2003

Related U.S. Application Data

(63) Continuation-in-part of application No. 09/397,322, filed on Sep. 16, 1999, now abandoned.

(51) Int. Cl.
*C07H 1/00* (2006.01)
*A61K 31/715* (2006.01)
(52) U.S. Cl. ........................ 536/124; 536/128; 514/60
(58) Field of Classification Search .............. 536/102, 536/124, 128; 514/60
See application file for complete search history.

(56) References Cited

U.S. PATENT DOCUMENTS

| 1,899,952 | A | * | 3/1933 | Giesecke | 127/28 |
| 3,137,592 | A | * | 6/1964 | Protzman et al. | 127/71 |
| 5,320,669 | A | * | 6/1994 | Lim et al. | 536/105 |
| 5,449,708 | A | | 9/1995 | Schiltz | |
| 5,922,379 | A | | 7/1999 | Wang | |

* cited by examiner

*Primary Examiner*—James O. Wilson
*Assistant Examiner*—Everett White
(74) *Attorney, Agent, or Firm*—Sukanya N. Jesadanont

(57) ABSTRACT

A non-synthetic biodegradable starch-based composition is described comprising starch, plasticizer, reinforcing filler, binder, in the presence or absence of alkali or salt, and water. The starch-based composition is subjected to transformation process to produce various foam-liked products, having closed cell structure with dense skin layer. These products are particularly suitable for use as disposal or single-used food packages or containers. These products are to substitute the shape bodies currently used made of plastic or plastic foam. A transformation process of the non-synthetic biodegradable starch-based composition into various foam-liked products is also described. The process is either injecting or compressing the starch-based composition and forming a desired shape in a closed mould at a temperature ranging from 150 to 300 degree Celcius until the gelatinization of starch has been accomplished.

1 Claim, No Drawings

NON-SYNTHETIC BIODEGRADABLE STARCH-BASED COMPOSITION FOR PRODUCTION OF SHAPED BODIES

CROSS-REFERENCE TO RELATED APPLICATION

This is a continuation-in-part of application Ser. No. 09/397,322, filed Sep. 16, 1999 now abandoned, whose contents are hereby incorporated.

BACKGROUND OF THE INVENTION

This invention relates to a non-synthetic biodegradable starch-based composition and to the process by which this composition is transformed into various foam-liked products.

Environmental concerns associated with the handling of packaging waste have emphasized the importance of developing biodegradable materials to alleviate the waste disposal problems. Different approaches have been proposed. Blending of plastics widely used in packaging such as polyethylene, polypropylene, and polystyrene with biodegradable fillers, particularly starch, to make those plastics which are synthetic materials become biodegradable has not been overly successful. Synthetic biodegradable polymer such as polylactic acid, polycaprolactone as well as naturally occuring polymers i.e. polyhydroxybutyrate and polyhydroxyvalerate have been investigated to replace plastic in packaging areas. It has been found that these materials are generally deficient in properties required in packaging applications and excessively expensive.

Starch is of interest as a biodegradable material because of its availability as agricultural surplus raw material, its low cost and its thermoprocessibility. There has been much interest recently in developing starch-based package for single use, particularly foam-liked articles such as tray, cup, bowl and fast food box. According to its thermoplastic properties, starch can be expanded when it is heated above its glass transition temperature, in the presence of water and pressure and simultaneously formed into a desired shape.

Starch is a non-synthetic, bio-polymer, consisting principally of amylose and amylopectin. When starch is appropriately conditioned or formulated, it may be formed into foam-liked materials. The appropriate conditioning or formulating may relate to moisture, temperature, pressure, acid-base value and addition of some chemicals.

In Patent Cooperation Treaty (PCT) Publication No. WO 83/02955, a foamed starch product is produced by extruding mixture of starch and gas releasing agent. The foamed starch product may be used as foam sheets or cushioning fillers for packing.

In Patent Cooperation Treaty (PCT) Publication No. WO 97/10293, a process is disclosed for the production of shaped bodies, in particular packaging shaped bodies, from biologically decomposable material using a viscous mass containing biologically decomposable fiber material, particularly waste paper fiber, water and starch. This viscous mass is baked in a closed mould to produce a shaped body. This shaped body is then subjected to liquid-impermeable coating to increase water resistance of the shaped body.

While the disclosures mentioned above show the use of gas releasing agent to create a cell structure of the product and the use of waste paper fiber to strengthen the shaped bodies, the present invention discloses the method of preparation foam-liked products from the non-synthetic biodegradable starch-based composition without using gas releasing agent. Waste paper pulp may not be economically feasible in some countries for this kind of product, the present invention relates to the application of limestone powder and cassava pulp to make the product stronger and more dimensionally stable at a lower cost.

The non-synthetic, biodegradable starch-based composition described in the present invention is a much better improvement over the invention of Wang (U.S. Pat. No. 5,922,379) in that Wang has described the protein/starch thermoplastic composition whose main component is protein either of plant or animal origin 10–46 or 50 wt % which is quite high and makes the product very costly, renders the product not commercially feasible and much more difficult to process or handle. Such high protein compositions of the product as described by Wang can never be used under the forming condition using quite high temperature of 150–300 degree Celsius and the compression technique described in the present invention due to the fact that optionally incorporation of any protein greater than 5 wt % causes the shaped bodies to become brittle, charred and burnt before the starch in the mixer becomes fully gelatinized, thus causes the failure of manufacturing process. This is also the reason that some starch or flour need to be especially chosen to limit the protein content of not greater than 5 wt %. In addition, in some combination of the ingredients, protein may not be necessary at all as indicated by 0% by weight of protein added to minimize the cost yet giving the product most desirable. Thus, protein is not the main component of the shaped bodies presently described which is significantly different from that of Wang's. Adding high protein of any origin in the compositions of Wang's makes it not possible to manufacture under the condition described in the present invention with too many serious disadvantages.

Firstly, it makes the product become too costly and not possible to commercialize as the cost of the product is not competitively feasible compared to those non-biodegradable foam plastic containers presently available in the market. Secondly, under the presently described condition where mixing and kneading until uniform mixture is obtained before being injected or compressed into a closed mould of temperature ranging 150–300 degree Celcius to allow full gelatinization of starch to be accomplished, such high forming temperature used in the present invention causes the denaturation of any high protein composition greater than 5% by weight and destroys the shape bodies. Thirdly, the charred shaped bodies got stuck to the mould surface and causes all the troubles which makes the manufacturing process not possible. Fourthly, if these high protein compositon is really needed, to reduce the troubles to a certain degree but not all is to add quite a high quantity of lubricant which in turn would additionally increase the cost of production significantly. All these crucial reasons make manufacturing the protein/starch-based thermoplastic composition described by Wang not possible, in addition that it is not commercially feasible.

The non-synthetic biopolymers used as the main ingredients in the present invention with no addition of any of the synthetic plastic polymers like EAA or acrylic acid derivatives or polyethylene makes the present invention distinctly different than that of Schiltz (U.S. Pat. No. 5,449,708). This is a great improvement which leads to a big impact regarding the residue left in the environment. The shaped-bodies of the present invention after being used as containers for food or any other materials, can be used further for cattle and pig feeding or may be used as fertilizer leaving nothing at all and no harm to the environment. Contrast is true for Schiltz's invention as their products although biodegradable still leave a lot of synthetic polymers (49.8% of the mass) very harmful to the environment as they accumulated. In other word, the product described in the present invention is 100% biodegradable while Schiltz's is not.

Therefore, the present invention describes a non-synthetic, biodegradable starch-based composition and a method for production of shaped bodies which is a great improvement over the prior arts where injection or compression into a closed mould instead of the extrusion process with a foam die or baking used in prior arts.

SUMMARY OF THE INVENTION

The present invention provides a non-synthetic biodegradable starch-based composition comprising starch, plasticizer, reinforcing filler, binder, thereof in the presence or absence of alkali or salt, and water. The non-synthetic biodegradable starch-based composition is subjected to further transformation process to produce various foam-liked products, having closed cell structure with dense skin layer. These products are suitable for many general uses for consumption, particularly for disposal or single-used food packages or containers. These products are aimed to substitute materials currently used which are normally made with synthetic plastic or plastic foam harmful to the environment.

Another embodiment of this invention relates to a transformation process of the non-synthetic biodegradable starch-based composition into various foam-liked products. The process is either injecting or compressing the non-synthetic biodegradable starch-based composition and forming it simultaneously into a desired shape in a closed mould at a temperature ranging from 150 to 300 degree Celcius until the gelatinization of starch has been accomplished. The foam-liked products obtained from this invention are fully biodegradable.

DETAILED DESCRIPTION OF THE INVENTION

Starch is a bio-polymer which is non-synthetic and can form into rigid foam-liked materials under appropriate conditions. However, the use of starch alone will result in products less stable or less useful for further applications. Therefore, it is necessary to add other compounds to improve the properties of starch and/or its products so that they are more suitable for manufacturing, transportation, sale, and use for various purposes, etc.

The present invention describes the appropriate additive compounds and their proportions that should be added to starch. From the successful research, the inventors are able to invent a non-synthetic biodegradable starch-based composition which is suitable for further transformation to produce foam-liked products. These products have a closed cell structure and dense skin layer. Yet they are fully biodegradable and suitable for many general uses for consumption, particularly for disposal or as single-used food packages or containers. These products are aimed to substitute materials currently used which are normally made with plastic or plastic foam. Plastics, including plastic foams, are synthetic materials which are very difficult and take very long time to degrade. Plastics and foams are excessively used in our everyday life, and usually in the form of packages and packaging materials. The disposal of plastic waste is hardly friendly to the environment. The use of products resulted from the present invention will considerably reduce the environmental problems.

Starch used in the preparation of the non-synthetic biodegradable starch-based composition according to the present invention is from about 30 to 70% by weight. The said starch may be flour, starch or modified starch. The starch used may be singly or mixture of the following starch-containing materials; cassava, rice, glutinous rice, sweet potato, corn potato, sorghum and sago. The selection of starch or mixture of starch is based on its proportion of amylose and amylopectin and the desired properties of finished products.

Suitable type and quantity of plasticizer will increase flexibility of finished products, ease of forming process and may improve viscosity of starch mix. Illustrative plasticizers that can be used in the present invention are as follows:

(a) polyols, such as sorbitol, glycerol, polyethylene glycol, propylene glycol and derivatives of glycerol;

(b) mono, di- and oligosaccharides, such as sugar, glucose, fructose, glucose syrup and honey;

(c) lipids and their derivatives, such as fatty acid, monoglyceride, diglyceride, distilled acetylated monoglyceride and phospholipid.

The plasticizers listed above may be used one kind or mixture of several kinds in the range of 0 to 10% by weight.

Reinforcing fillers will improve strength, stability and resistance to water and oil of the finished products. Illustrative reinforcing fillers are limestone powder and cassava pulp which is a by-product from cassava mill or diatomaceous earth, silicate derivatives, bentonite or any natural fibrous materials. The reinforcing fillers listed above may be employed one kind or mixture of them in the range of 0 to 30% by weight.

Binders may be necessary when smooth surface of finished products is desired. In addition, they may reduce water absorption and improve oil resistance of finished products. Illustrative binders include: hydrocolloids such as alginate, gum, agar, carrageenan, konjak flour; proteins such as egg white and soy protein or any protein of plant or animal origin. The binders may be used one kind or mixture of several kinds in the range of 0 to 5% by weight.

In the present invention, the transformation of the non-synthetic biodegradable starch-based composition into foam-liked products is preferably carried out in the presence of an alkali or salt or mixture of them. Alkali or salts include calcium hydroxide, sodium hydroxide, potassium hydroxide, calcium carbonate, sodium carbonate, potassium carbonate, ammonium carbonate, sodium bicarbonate and ammonium bicarbonate. The addition of the alkali or salts listed above will improve the reaction among components and may reduce temperature and time necessary for forming process. In addition, it may improve strength of finished products.

Water is added to make up a total of 100% and should be adequate for gelatinization of starch in the non-synthetic biodegradable starch-based composition.

| Example 1 | |
|---|---|
| Cassava starch | 450 g |
| Konjak flour | 20 g |
| Modified starch | 30 g |
| Cassava pulp | 100 g |
| KOH (1N) | 7 g |
| Carrageenan | 3 g |
| Water | 390 g |

-continued

| Example 2 | |
|---|---|
| Cassava starch | 300 g |
| Rice flour | 50 g |
| Modified starch | 20 g |
| Cassava pulp | 150 g |
| Sorbitol | 80 g |
| NaOH (1N) | 10 g |
| Agar | 10 g |
| Water | 380 g |

All ingredients are mixed and kneaded until uniform mixture is obtained. Forming this mixture into a desired shape may be done by injection or compression method in a closed mould at a temperature ranging from 150 to 300 degree Celcius until the gelatinization of starch has been accomplished.

It will be understood that modifications can be made in the above description without departing from the scope of this invention by one of ordinary skill in the art. It is accordingly intended that all matter contained in the above description be interpreted as descriptive rather than in a limiting sense.

It is also to be understood that the following claims are intended to cover all of the generic and specific features of the invention as described herein, and all statements of the scope of the invention which, as a matter of language, might be said to fall therebetween.

We claim:

1. A process for preparing non-synthetic, biodegradable starch-based composition for shaped-bodies comprising mixing and kneading starch, water, and optionally plasticizer, reinforcing filler, binder, alkali or salt; until a uniform mixture is obtained and thereafter injecting or compressing said mixture into a closed mould at temperature 150–300 degree Celsius until gelatinization of starch is accomplished to give a product of desired shape;

where said starch used is 30–70% by weight of the composition of starch prepared from cassava, rice, glutinous rice, sweet potato, corn, potato, sorghum or sago, either singly or as mixture, in form of flour or starch or modified starch;

where said plasticizer used is up to 10% by weight of the composition selected from the following groups consisting of polyols which are glycerol or sorbitol, or saccharides which are sugar, glucose, fructose, glucose syrup and honey; or lipids or their derivatives which are fatty acid, fatty acid esters, monoglycerides, diglycerides, distilled acetylated monoglyceride or phospholipid, which may be used singly or as mixture;

where said reinforcing filler used is up to 30% by weight of the composition which are limestone powder, diatomaceous earth, bentonite, cassava pulp or natural fibrous materials, and may be used singly or as mixture;

where said binder used is up to 5% by weight selected from the following groups consisting of hydrocolloids which are alginate, gum, agar, carrageenan and konjak flour, or proteins which are egg white or soy protein or any of animal or plant origin, which may be used singly or as mixture;

where said alkali or salt is selected from calcium hydroxide, sodium hydroxide, potassium hydroxide, calcium carbonate, sodium carbonate, potassium carbonate, ammonium carbonate, sodium bicarbonate and ammonium bicarbonate, which may be used singly or as mixture added to make the pH of the mixture close to neutral or slightly alkaline; and where water is added to make up said composition a total of 100% by weight.

* * * * *